PROGRAMMED SWITCHING OF SERVO ERROR SIGNALS IN TAPE APPARATUS SYNCHRONIZING SYSTEMS

Filed March 29, 1965 2 Sheets-Sheet 1

GRANT M. SMITH
INVENTOR.

BY Robert G. Clay

ATTORNEY

GRANT M. SMITH
INVENTOR.

BY Robert G. Clay

ATTORNEY

United States Patent Office 3,379,828
Patented Apr. 23, 1968

3,379,828

PROGRAMMED SWITCHING OF SERVO ERROR SIGNALS IN TAPE APPARATUS SYNCHRONIZING SYSTEMS

Grant M. Smith, Cupertino, Calif., assignor to Ampex Corporation, Redwood City, Calif., a corporation of California Filed Mar. 29, 1965, Ser. No. 443,400
11 Claims. (Cl. 178—6.6)

Figure 1:
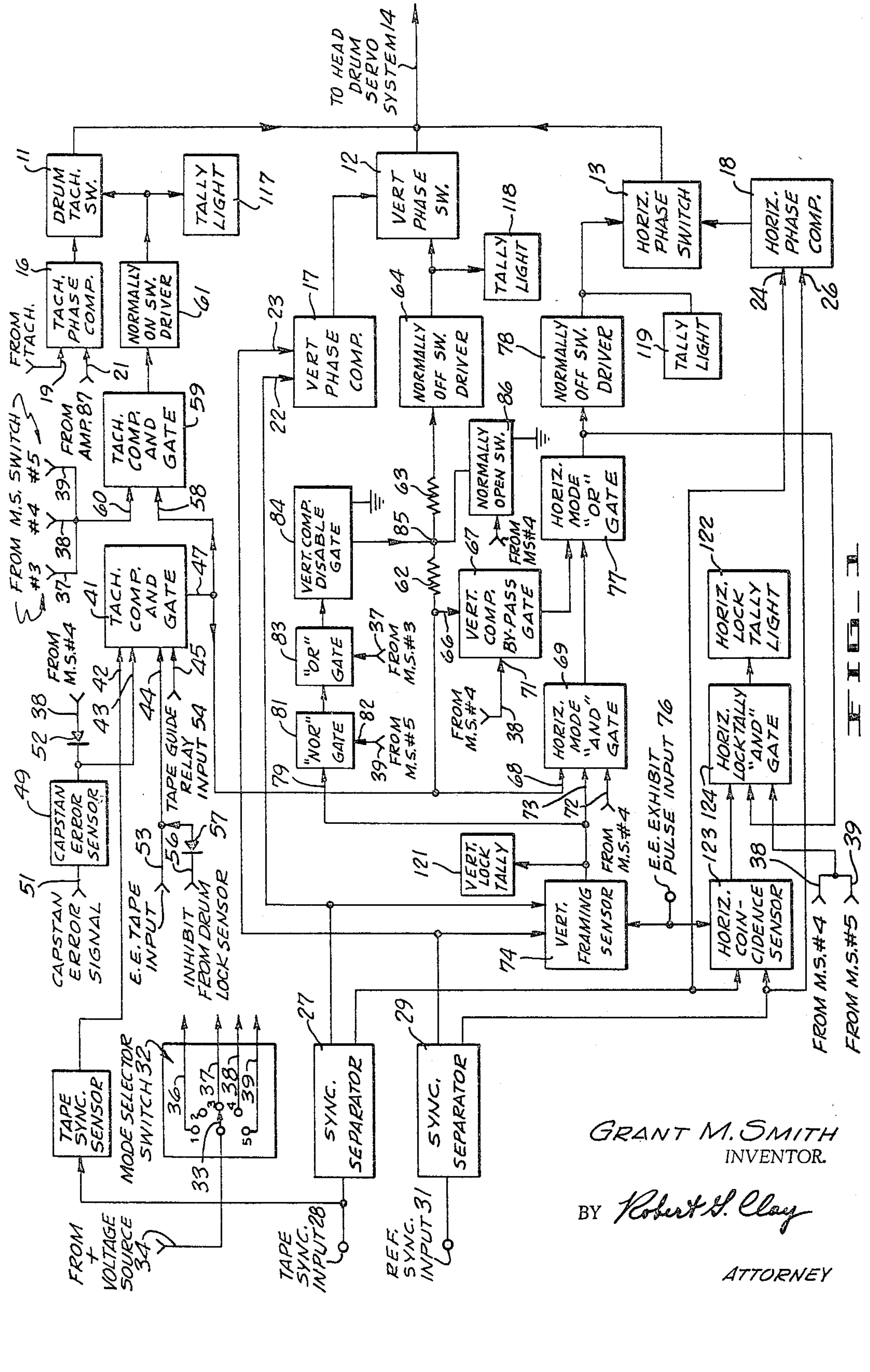

This invention relates generally to signal synchronizing systems of the type employed for synchronizing information derived from a prerecorded magnetic tape with information derived from another source, and is more particularly directed to programmed contol of the switching of servo error signals in systems of this type to avoid runaway of the system when changed from one error source to another.

Various systems exist for automatically maintaining the reception or transmission of signal information from one source in synchronism with signal information derived from another independent source. Such systems are particularly useful for synchronizing television signals derived from a recorded magnetic tape and other diverse sources of television signal information, such as a television camera employed for pickup of a live show in the studio. In this manner, programming material from a number of different television signal sources may be interposed to provide a composite program for transmission. In addition, various special effects such as fading in or fading out of the picture, mixing of two or more signals, split screen displays, etc. may be introduced with the requisite synchronism during television transmission. To effect the desired synchronism, tape apparatus synchronizing systems are arranged to lock the angular velocity of the rotary magnetic transducer head scanning drum in synchronism with any of a number of selectable external synchronizing signals such as may be derived from a local studio reference sync generator, a network master sync generator, a power line, or the like, and which is in synchronism with signal information to be transmitted or received from a source other than the recorded tape. More particularly, a synchronizing system develops error signals which are proportional to deviations between various synchronizing components derived from the associated tape recording and reproducing apparatus and the selectable external synchronizing signals. The error signals in turn control the head drum velocity to compensate for the detected error. The accuracy with which lockup of the head drum is obtained is determined by the particular error signal employed for control. The particular error signal in command, and therefore the accuracy of control, depends upon which of a number of selectable operating modes the system is in. There are basically three error signals that are developed in a typical synchronizing system, namely, a first or coarsest signal, a second or coarse signal, and a third or fine signal. The first signal is derived through a comparison of the phase of the head drum angular velocity, as represented for example by a head drum tachometer signal, and the phase of a power line or other external reference signal. The second signal is provided by comparing the "off-tape" vertical rate sync to an external reference vertical rate sync. The third signal is indicative of the phase difference between the "off-tape" horizontal rate sync and an external horizontal rate sync signal. These error signals are employed alone or sequentially in combination depending upon the particular operational mode selected. The first, second, and third error signals are respectively hereinafter referred to as tachometer, vertical, and horizontal error signals.

Heretofore, in the operational modes involving the use of more than one error signal for control, sequential switching between error signals has been accomplished in accordance with a predetermined sequence of fixed time delays during which certain key events and conditions generally, although not necessarily occur. The previous occurrence of these conditions and events, is necessary to elimiate the possibility of runaway (or failure to lockup) upon switching from one error signal to another. Inasmuch as switching between error signals may occur in previous synchronizing systems without the attainment of the key conditions, such systems are suscetpible to runaway malfunction whereupon lockup between the tape and external signals is difficult, if not impossible to achieve without stopping the tape recording and reproducing apparatus and then initiating a new synchronizing cycle.

It is therefore an object of the present invention to provide an improved tape apparatus synchronizing system wherein the possibility of runaway upon switching between servo controlling error signals is substantially eliminated.

Another object of the invention is to provide a tape apparatus synchronizing system having provision for programmed switching between servo error signals in accordance with the occurrence of predetermined key events and conditions.

Still another object of the invention is the provision of a synchronizing system of the class described wherein a plurality of operational modes are manually selectable so as to afford substantial versatility of operation.

It is yet another object of the invention to provide a tape apparatus synchronizing system wherein selection of any of a plurality of error signals for command of the tape apparatus head drum servo is accomplished by switching signals controlled in accordance with predetermined logic selectable to effect desired modes of operation.

Still another object of the invention is to provide a synchronizing system of the class described which automatically recycles error signal control when desired conditions for control by a given error signal are interrupted.

It is a further object of the invention to provide a tape apparatus synchronizing system having provision for selection of a number of different external reference signals in both the record and playback modes of operation.

A still further object of the invention is the provision of a synchronizing system of the class described having means for indicating the existence of certain operational conditions in the system for convenience in operation and maintenance.

Figure 2:
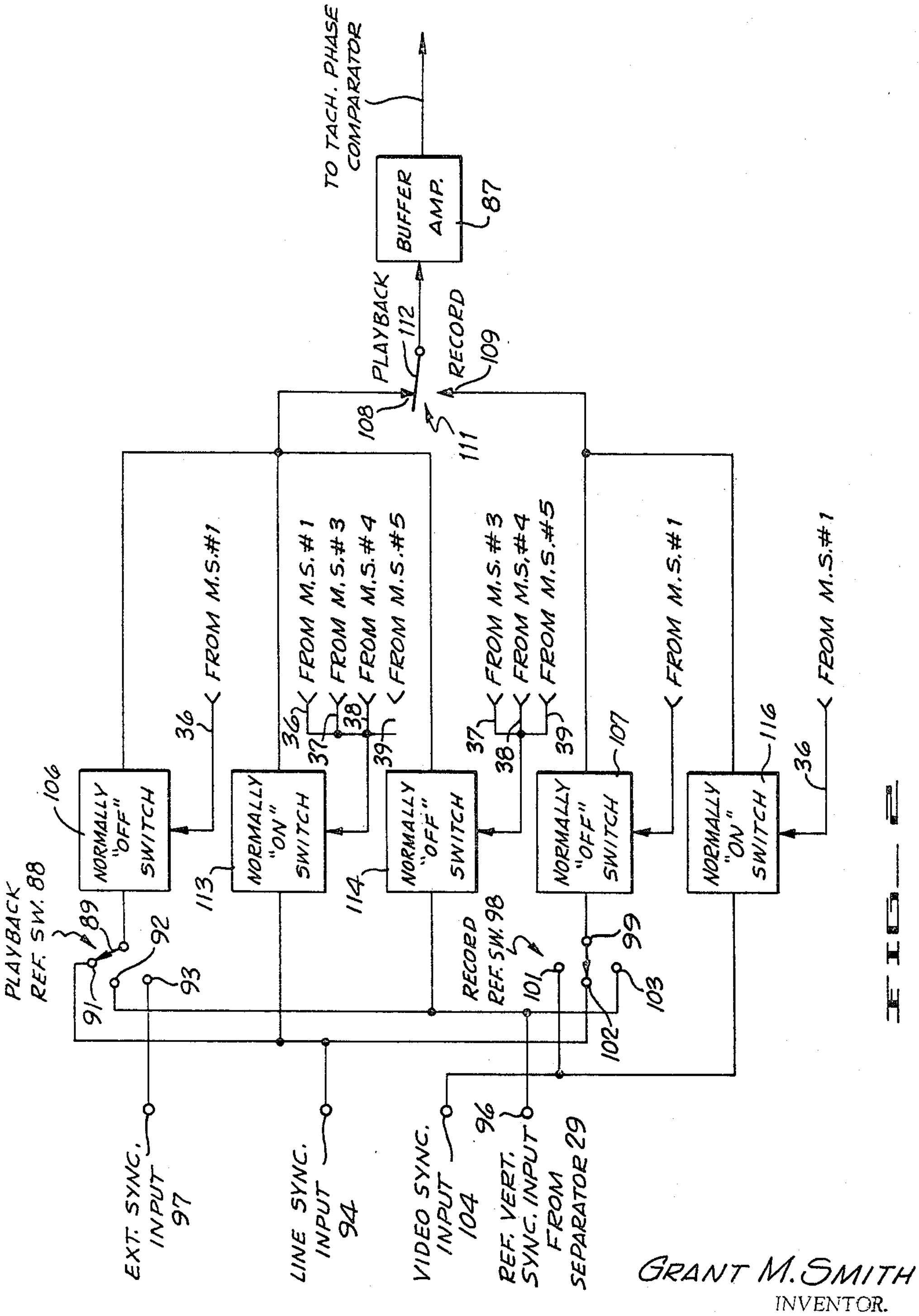

Other objects and advantages of the invention will become apparent upon consideration of the following detailed description of the invention in conjunction with the accompanying drawings, wherein:

FIGURE 1 is a block diagram of the principal portion of a tape apparatus synchronizing system in accordance with the invention; and FIGURE 2 is a block diagram of a further portion of the synchronizing system.

Referring now to the drawings in detail, there will be seen to be provided a tape apparatus synchronizing system arranged for programmed switching of servo error signals in accordance with the present invention. The drawings primarily depict the switching arrangement of the system in conjunction with various inputs from other portions of the system which are conventional in design and operation, and are therefore not included in the drawings for purposes of simplicity and clarity. For details of a conventional synchronizing system in which the programmed switching arrangement may be incorporated, reference may be had to Instruction Manual P59505, Model 1020 Inter-Sync and Instruction Manual 1809924-01 (Servo Section) Model 1021 Inter-Sync, Television Synchronizer, December 1960, Ampex Corporation.

The programmed switching arrangement of the synchronizing system, as best shown in FIGURE 1, generally includes a plurality of electronically controllable error signal selector switches 11, 12, and 13 having their outputs connected in common to the input of a conventional head drum servo system, as depicted generally at 14. The servo system functions in a well known manner to control the angular velocity and position of the rotary magnetic transducer head drum of associated magnetic tape recording and reproducing apparatus in accordance with an error signal applied to the input of the servo system. The input of drum tachometer switch 11 receives a first, or tachometer error signal from a tachometer phase comparator 16. The inputs of vertical and horizontal phase switches 12 and 13 respectively receive second, or vertical, and third, or horizontal, error signals from vertical and horizontal phase comparators 17 and 18. One input 19 of phase comparator 16 receives a signal from a tachometer, or equivalent means, which is driven by the head drum and generates a signal proportional to head drum angular velocity. The other input 21 of this comparator receives one of a number of external reference signals which are selectable in a manner subsequently described. The tachometer error signal as derived from comparator 16 is proportional to the difference between the angular velocity of the drum and the frequency of an external reference signal. Inputs 22 and 23 of phase comparator 17 respectively receive an off-tape vertical sync signal and an external reference vertical sync signal. Similarly, inputs 24 and 26 of phase comparator 18 respectively receive an off-tape horizontal sync signal and an external reference horizontal sync signal. The off-tape vertical and horizontal sync signals are received from a sync separator 27 to which a composite signal is applied from a tape sync input 28 deriving sync pulses from a video signal recorded on tape processed by the tape apparatus. The reference vertical and horizontal sync signals are derived from a second sync separator 29 receiving a composite signal from a reference sync input 31 energized by an external reference sync source such as a local studio sync generator. The vertical error signal is thus proportional to the frequency difference between the off-tape and reference vertical sync signals, while the horizontal error signal is proportional to the frequency difference between the off-tape and reference horizontal sync signals.

Selection of the respective error signals for command of the head drum servo system is accomplished by energization of the switches 11, 12, and 13 with control signals which are effective to close the respective switches and apply the corresponding error signals to the servo system input 14. Application of the control signals to the switches is conducted in accordance with a plurality of predetermined programs for accomplishing various modes of operation which are selectable by means of a multi-position mode selector switch 32. In the illustrated case the switch 32 has five contacts or terminals numbered consecutively from 1 to 5, and a selector arm 33 which is movable into conductive engagement with the respective contacts. Contacts 1 to 5 respectively correspond to "preset," "normal," "vertical," "horizontal," and "automatic" modes of operation. Selector arm 33 is connected to a positive voltage source as generally indicated at 34, while contacts 1, and 3 to 5 inclusive are respectively connected to buses 36 to 39, inclusive. Thus, upon movement of the selector arm into engagement with respective ones of contacts 1 and 3 to 5, the corresponding buses are armed with positive voltage from source 34. The buses 36 to 39 are coupled to logic circuitry, the preferred form of which is subsequently described in detail herein, which generates the control signals applied to the error signal selector switches 11, 12, and 13. Arming of the respective buses, or in the case of contact 2 absence of arming voltage, conditions the logic circuitry to generate control signals in accordance with different predetermined logic programs commensurate with the various selectable modes of operation.

The logic programs established in accordance with the various selectable positions of the mode selector switch 32 are in basic respects as set forth hereinafter. The programs described below are applicable to operation of the tape apparatus during playback, and it should be noted that a different relatively simple logic program is employed during record. Therefore during playback, when the "preset" mode is selected by placing the selector in engagement with contact 1, the drum tachometer switch 11 is closed by a control signal applied thereto and the tachometer error signal, i.e., drum tachometer vs. a selected external or internal reference, is in command of the head drum servo system 14.

In the "normal" mode, when the selector engages contact 2, a control signal closes switch 11 and an external power line reference is applied to the tachometer phase comparator 16. The tachometer error signal (in this case drum tachometer vs. external power line reference) is in command of the head drum servo system.

The "vertical" mode logic program selected by positioning of the selector arm in engagement with contact 3, is of greater complexity than either of the programs previously described. More particularly, initially a control signal closes switch 11 and the external reference vertical sync is applied to tachometer phase comparator 16. The tachometer error signal (in this case drum tachometer vs. reference vertical sync) is in command of the head drum servo system. However, when a number of key conditions occur in the associated tape apparatus, namely the tape guide relay has closed, system control has switched the video signal system from EE (electronics to electronics) to tape, an off-tape sync signal is being stably recovered from the tape video signal, the head drum servo is locked to the tachometer error signal, and the capstan servo error signal has diminished to within insignificant limits indicating that the capstan of the tape apparatus is tracking the head drum, an "on" control signal is applied to the vertical phase switch 12 and the control signal at switch 11 is terminated. Switch 12 is thus closed to place the vertical error signal from vertical phase comparator 17 in command of the head drum servo system. In the event that any of the key conditions are interrupted, the logic is such as to open switch 12 and close switch 11 to thereby automatically recycle the system to the command of the tachometer error signal until all of the key conditions are again met.

Selection of the horizontal mode program is accomplished by placing the selector 33 of switch 32 in engagement with contact 4. With this program, switch 11 is initially closed and external reference vertical sync is applied to tachometer phase comparator 16. A tachometer vs. reference vertical sync error signal is thus initially in command of the head drum servo system. When a number of key conditions are satisfied, namely, the tape guide relay is energized, the video signal system has been switched to tape from EE, a stable off-tape sync signal is present, and the drum servo system is locked to the tachometer error signal, the horizontal phase switch 13 is closed and the drum tachometer switch 11 is opened by appropriate channeling of the control signals to the error signal selector switches. The horizontal error signal is thus in command of the head drum servo system 14. Upon interruption of any of the key conditions, the logic is such as to open switch 13 and close switch 11 to thereby automatically recycle the system to the command of the tachometer error signal until all of the key conditions are again satisfied.

The logic program for the "automatic" mode of operation is substantially more involved than any of the other operational modes provided by the synchronizing system. In accordance with this program, the head drum servo system is initially under the command of the tachometer error signal as derived from tachometer phase comparator 16. More particularly, switch 11 is closed and reference vertical sync is applied to the comparator such that the commanding error signal is tachometer vs. reference vertical sync. Responsive to energization of the tape guide relay, switching of the video signal system from EE to tape, locking of the drum servo system to the tachometer error signal, recovery of stable sync signal from the tape, and attainment of capstan framing, switch 11 is opened while switch 12 is closed. The vertical error signal (off-tape vertical sync vs. reference vertical sync) is accordingly placed in command of the head drum servo system. Upon the attainment of vertical framing, i.e., off-tape odd and even fields are in phase with reference sync odd and even fields, respectively, switch 12 is opened and switch 13 is closed to thereby place the horizontal error signal in command of the head drum servo system. If vertical framing is lost, the logic reverses the conditions of switches 12 and 13 to again place the vertical error signal in command of the head drum servo until vertical framing is restored at which time the switches operate to again place the horizontal error signal in command. If any of the other key conditions are interrupted, the logic operates the switches to place the tachometer error signal in command of the head drum servo system until the key conditions are again satisfied. The logic then recycles the system through the sequence described above.

Various logic circuits may be employed to provide the previously noted logic programs for governing the error signal switching operation of the synchronizing system in accordance with the selected operational modes. In this regard, the logic circuitry preferably includes a first tachometer comparator AND-gate 41 having a plurality of inputs 42 and 45, inclusive, and an output 47. A tape synchronization signal sensor 48 coupled to tape sync input 28 applies a signal to gate input 42 in response to the existence of off-tape sync at the input 28. Gate input 43 is connected to the junction between a capstan framing error sensor 49 energized by a capstan error signal output, as indicated at 51, of the associated tape apparatus, and an isolating diode 52 connected to bus 38 from mode selector switch contact 4. The sensor 49 operates to generate a signal when the capstan error signal diminishes to substantially zero, indicating that capstan framing has been established. An EE/tape input 53 is connected to gate input 44 to apply a signal thereto from video system control when the signal has been switched from EE to tape. A tape guide relay input 54 is connected to gate input 45 to apply a signal thereto responsive to energization, and therefore pull-in, of the tape guide relay of the associated tape apparatus. A final condition required to produce a signal at the gate output 47 is that the head drum be locked. This may be advantageously accomplished by coupling a drum lock sensor inhibit input 56, preferably through the intermediary of an isolating diode 57, to gate input 44. This inhibit input is derived from the head drum servo system and serves to normally inhibit the gate input until drum lockup is obtained. Accordingly, both the EE/tape signal and absence of the inhibit signal are required to energize gate input 44. It will be thus appreciated that conditions of recovery of off-tape sync, capstan framing or selection of "horizontal" mode, system switching from EE to tape, pull-in of the tape guide relay, and lock-up of the head drum servo system, must occur coincidently, in order to produce a signal at output 47 of gate 41.

The output of AND-gate 41 is connected to input 58 of a second tachometer comparator AND-gate 59. A second input 60 of gate 59 is connected in common to buses 37, 38, and 39 from the mode selector switch contacts 3, 4, and 5. The output of gate 59 is coupled to a "normally on" switch driver 61 having its output connected to drum tachometer switch 11 to normally apply a control signal thereto and maintain the switch closed. When a signal is generated at the output of gate 59, the switch driver is turned-off to in turn terminate the control signal applied to switch 11 and turn same off. Thus, when the mode selector switch is in any of the "vertical," "horizontal," or "automatic" mode positions, and a signal appears at the output of gate 41, indicating establishment of all of the predetermined key conditions, the drum tachometer switch is turned-off to decouple the drum tachometer error signal from the head drum servo system 14.

The output of gate 41 is also coupled, as by means of a pair of resistors 62 and 63, to a "normally off" switch driver 64 coupled in controlling relation to the vertical phase switch 12. Driver 64 normally does not apply a control signal to switch 12 such that same is normally off. However, in response to the application of a signal from the output of gate 41 to the driver, the latter is turned on to apply a control signal to switch 12 and thereby close same.

In addition, the output of gate 41 is coupled to an input 66 of a vertical comparator by-pass AND-gate 67 and to an input 68 of a horizontal mode AND-gate 69. A second input 71 of gate 67 is connected to bus 38 from mode selector switch contact 4, as is a second input 72 of gate 69. A third input 73 of gate 69 is coupled to the output of a vertical framing sensor 74 having inputs coupled to the vertical outputs of sync separators 27 and 29. The framing sensor compares the phases of the off tape and reference vertical sync signals and when framing occurs applies an output signal to gate input 73. To prevent the sensor from generating the output signal when the system is in the EE mode, an EE inhibit pulse input 76 is coupled to the sensor to inhibit the output until the system is switched to the tape mode. The outputs of AND-gates 67 and 69 are coupled to the inputs of a horizontal mode OR-gate 77 having its output connected to a "normally off" switch driver 78 coupled in controlling relation to horizontal phase switch 13. When a signal is produced at the output of gate 67 or of gate 69, gate 77 applies a signal to driver 78 to turn same on. As a result, a control signal is generated to close switch 13 and thereby apply the horizontal error signal to the head drum servo system.

The output of the vertical framing sensor 74 is also coupled to one input 79 of a NOR-gate 81, the other input 82 of which is coupled to bus 39 from mode selector switch contact 5. A pair of inputs of an OR-gate 83 are respectively coupled to the output of the NOR-gate and to bus 37 from mode selector switch contact 3. The output of OR-gate 83 is in turn coupled in controlling relation to a vertical comparator disable gate 84 which is coupled to the common junction 85 between resistors 62 and 63. The gate 84 functions to normally clamp the junction to ground and thereby disable the switch driver 64, and therefore the vertical phase switch 12. Responsive to a signal from OR-gate 83, disable gate 84 decouples junction 85 from ground to enable the switch driver 64 to react to signals applied to the resistors 62 and 63. A normally-open electronic switch 86 is also connected between junction 85 and ground. The control input of this switch is connected to bus 38 from mode selector switch contact 4. Thus, in the horizontal mode, the switch is closed to short junction 85 to ground and disable the switch driver 64.

Considering now the selection of various reference signals employed in the development of the tachometer error signals for the different modes of operation of the synchronizing system, it is to be noted that input 21 of tachometer phase comparator 16 is coupled to the output of a buffer amplifier 87 energized by an additional portion of the logic circuitry as illustrated in FIGURE 2. As shown therein a playback reference selector switch 88 is provided which includes a movable selector arm 89 and a plurality of contacts 91, 92, and 93. Contact 91 is connected to a power line sync input 94, while contact 92 is connected to a reference vertical sync input 96 which receives the reference vertical sync output signal of sync separator 29. Contact 93 is connected to an external sync input 97 which may be any desired external reference other than the line sync and reference vertical sync signals provided at inputs 94 and 96.

A record reference selector switch 98 is likewise provided including a movable selector arm 99 and a plurality of contacts 101, 102, and 103. Contact 101 is connected to a video sync input 104 which is the sync portion of a video signal to be recorded. Contacts 102 and 103 are respectively connected to the line and reference vertical sync inputs 94 and 96.

The selector arms 89 and 99 of switches 88 and 98 are rsepectively coupled by "normally off" electronically controlled switches 106 and 107 to playback and record contacts 108 and 109 of a playback-record selector switch 111 having a selector arm 112 coupled to the input of buffer amplifier 87. Control inputs of switches 106 and 107 are both connected to bus 36 from contact 1 of mode selector switch 32. Thus, when selector switch 32 is placed in the preset mode position wherein selector arm 33 engages contact 1, switches 106 and 107 are turned on. Consequently, in this mode whatever reference signal is selected by playback reference switch 88 is applied to buffer amplifier 87, and therefore to tachometer phase comparator 16, when the switch 111 is in the playback position. Similarly, when switch 111 is in the record position, whatever reference signal is selected by record reference selector switch 98 is applied to phase comparator 16.

In addition to the above-described arrangement of switches, there is provided a "normally on" electronically controlled switch 113 connected between line sync input 104 and playback contact 108 of record-playback selector switch 111. A "normally off" electronically controlled switch 114 is similarly connected between the reference vertical sync input 96 and playback contact 108. Finally, a "normally on" electronically controlled switch 116 is connected between the video sync input 104 and the record contact 109 of the playback-record selector switch 111. The control input of switch 113 is connected in common with buses 36 to 39 from contacts 1 and 3 to 5 of mode selector switch 32, while the control input of switch 114 is connected in common with buses 37 to 39 from contacts 3 to 5. The control input of switch 116 is connected to bus 36 from contact 1.

The overall operation of the logic circuitry of the synchronizing system follows generally from the logic programs noted hereinbefore. With the playback-record selector switch 111 in the record position, switch 107 is on and switch 116 is off when the mode selector switch 32 is in the "preset" position, to thereby apply to tachometer phase comparator 16 whatever of the video sync, line sync, and reference vertical sync inputs 104, 94, and 96 is selected by switch 98. Switch driver 61 is at this time on, thereby closing drum tachometer switch 11 such that the tachometer error signal from comparator 16 is applied to the head drum servo system input 14. The error signal during the preset record mode is thus tachometer vs. the selected external reference sync. In any of the other modes selectable by switch 32, switch 107 is off while switch 116 is on. As a result the tachometer error signal applied by switch 11 to the head drum servo during any of these modes of record is tachometer vs. video sync.

Considering now the various modes when switch 111 is in the playback position, it should be noted that when the selector switch 32 is in the "preset" position, switch 106 is on, switch 113 is off, and switch 114 is off. Therefore, any of the line sync, reference vertical sync, and external sync inputs 94, 96, and 97 may be selectively applied by means of switch 88 to the phase comparator 16. In the "preset" mode, drum tachometer switch 11 is closed whereby the tachometer error signal applied to the head drum servo system is tachometer vs. the selected external reference.

In the "normal" playback mode corresponding to position 2 of the selector switch 32, all of the electronically controlled switches of the logic circuit are in their normal conditions. It is to be noted in this regard that the signal paths through the circuit are such as to apply the power line input 94 via switch 113 to the phase comparator 16 and to apply the output of this comparator through switch 11 to the head drum servo system. The error signal in command during the "normal" mode is thus tachometer vs. power line. It is of importance to note that the normal mode condition of the logic circuit is attained without the application of voltage to any of the arming buses associated with selector switch 32. Therefore, when the system is in any of the other modes and arming voltage is lost, the system automatically reverts to the "normal" mode and is still operative.

When the system is placed in the "vertical" playback mode by positioning selector 33 in engagement with contact 3, bus 37 is armed with voltage. Therefore voltage is applied to the control inputs of switches 113 and 114 to thereby turn the former off and the latter on. The reference vertical sync signal from sync selector 29 is applied through switch 114 and buffer amplifier 87 to input 21 of tachometer phase comparator 16. Voltage from bus 37 is likewise applied through OR-gate 83 to vertical comparator disable gate 84 which responsively decouples junction 85 from ground. It will be therefore appreciated that initially the "normally on" switch driver 61 applies a control signal to drum tachometer switch 11 to close the same and connect the output of phase comparator 16 to the input 14 of the head drum servo system. In the "vertical" mode the error signal in command of the servo system is thus initially drum tachometer vs. reference vertical sync. However, in response to inputs 42 and 45 inclusive of AND-gate 41 being simultaneously energized, indicating satisfaction of the various key conditions and events discussed hereinbefore, a signal is produced at the output 47 of the gate and this signal is applied to input 58 of AND-gate 59, as well as through resistors 62 and 63 to the "normally off" switch driver 64. It is to be noted that input 69 of AND-gate 59 is armed with voltage from bus 37 such that a signal is produced at the gate output at this time and applied to the "normally on" switch driver 61. The switch driver 61 is thus turned off to remove the control signal from drum tachometer switch 11 and thereby turn this switch off. Simultaneously switch driver 64 is turned on to apply a control signal to the vertical phase switch 12 and thereby turn this switch on. The output of vertical phase comparator 17 is applied through switch 12 to the input of the head drum servo system. The error signal in command of the servo system at this time is hence the vertical error signal generated by the vertical phase comparator 17. In the event that any of the key conditions producing signals at the respective inputs of the AND-gate 41 is interruppted while the vertical error signal is in command, the signal at the output 47 of this gate will be terminated whereupon the signals applied to switch drivers 61 and 64 will be likewise terminated. These switch drivers in turn revert to their normal conditions and vertical phase switch 12 is respectively turned off and drum tachometer switch 11 is turned on to thereby place the tachometer error signal in command until all of the key conditions and events are again satisfied.

Considering now the horizontal playback mode of operation, upon placement of selector 32 of switch 34 in engagement with contact 4, bus 38 is armed with voltage. This effects energization of input 43 of AND-gate 41, input 60 of AND-gate 59, input 71 of vertical comparator by-pass gate 67, the control input of switch 86, and control inputs of switches 113 and 114. Switches 113 and 114 are respectively turned off and on to thereby apply reference vertical sync to input 21 of the tachometer phase comparator 16. Drum tachometer switch 11 is initially on such that the error signal applied to the head drum servo system is tachometer vs. vertical sync. As in the case of the vertical mode, when all of the inputs 42 to 45 inclusive of AND-gate 41 are energized responsive to satisfaction of the predetermined key events and conditions, a signal is produced at the gate output 47. The gate output signal is applied to input 58 of AND-gate 59 such that an output signal is applied to the "normally on" switch driver 61 which thereby turns drum tachometer switch off and terminates the application of the tachometer error signal to the head drum servo system. The signal at the gate output 47 is also applied to input 66 of vertical comparator by-pass gate 67 and such signal is prevented from appearing at the input of the switch driver 64 by virtue of the normally open switch 86 being closed due to the voltage from bus 38 and thereby shorting the junction 85 to ground. A signal is applied from the output of by-pass AND-gate 67 through horizontal OR-gate 77 to the switch driver 78. Switch driver 78 is turned on to thereby close horizontal phase switch 13 and apply the horizontal error signal to the input of the head drum servo system. The horizontal error signal remains in command of the servo system until such time as any of the key conditions is interrupted and one or more of the inputs of AND-gate 41 is de-energized. The signal at the output 47 of AND-gate 41 is then terminated such that signal is removed from input 66 of by-pass AND-gate 67 and the signal applied to the switch driver 78 is therefore terminated. Switch 13 is turned off to thereby remove the horizontal error signal from the input of the head drum servo system. Simultaneously due to termination of the signal at the gate output 47, switch driver 61 is turned on to close drum tachometer switch 11 and apply the tachometer error signal to the head drum servo system until the key conditions are again satisfied and a signal is again produced at the output of gate 41.

With selector 33 of mode selector switch 32 in engagement with contact 5, corresponding to the automatic mode, bus 39 is armed with voltage. The voltage from this bus is applied to input 60 of AND-gate 59, input 82 of NOR-gate 81, input 72 of horizontal mode AND-gate 67, and the control inputs of switches 113 and 114. Thus, as in the case of the vertical and horizontal modes described hereinbefore reference vertical sync is applied to input 21 of tachometer phase comparator 16. Initially the condition of the logic circuit is such that switch driver 61 maintains drum tachometer switch 11 on to apply the tachometer error signal from the output of comparator 16 to the head drum servo system. Now when the inputs of AND-gate 41 are all energized due to the predetermined key conditions and events being satisfied, resulting in the provision of a signal at the gate output 47, switch driver 61 is turned off in the same manner as in the vertical and horizontal modes, to in turn open switch 11 and decouple the tachometer error signal from the head drum servo system. The signal at gate output 47 is likewise applied through resistors 62 and 63 to the switch driver 64 to turn same on and close vertical phase switch 12 to couple the vertical error signal to the head drum servo system. The signal at the gate output 47 is able to control the switch driver 64 at this time because the vertical comparator disable gate 84 is energized and thereby decouples junction 85 from ground. More particularly, at this time no signal appears at input 79 of NOR-gate 81 while input 82 thereof is continuously energized by the voltage from bus 39. Under these conditions, the NOR-gate produces an output signal which is applied through OR-gate 83 to the control input of the disable gate 84. As time progresses and the vertical error signal approaches zero, indicating the attainment of vertical framing, a signal is produced at the output of vertical framing sensor 84 and is applied to input 79 of NOR-gate 81 and to input 73 of horizontal mode AND-gate 69. Hence, both inputs of NOR-gate 81 are energized in response to the attainment of vertical framing whereupon the output signal from the NOR-gate is terminated. Disable gate 84 is therefore de-energized and reverts to its normal condition of providing a short circuit to ground from junction 85. The signal from the output 47 of gate 41 is consequently prevented from appearing at the switch driver 64 such that same is turned off and the control signal is removed from the vertical phase switch 12. The vertical error signal from vertical phase comparator 17 is accordingly decoupled from the head drum servo system. At the same time the appearance of a signal at input 73 of AND-gate 69 results in all inputs thereof being energized such that an output signal is generated therefrom and applied through horizontal mode OR-gate 77 to switch driver 78. This signal effects closure of horizontal phase switch 13 which couples the horizontal error signal from horizontal phase comparator 18 to the input of the head drum servo system. It will be therefore appreciated that in the automatic mode, the system is automatically cycled from the tachometer error signal to the vertical error signal and finally to the horizontal error signal under the most desirable conditions for command of the head drum servo system. Moreover, in the event that vertical framing is lost when the head drum servo system is under the command of the horizontal error signal, the logic circuit automatically switches the head drum servo system to the command of the vertical error signal until vertical framing is again obtained. In this regard, when vertical framing is lost, the output signal from vertical framing sensor 74 is terminated with the result that AND-gate 69 is opened while one input 79 of the NOR-gate 81 is de-energized.

A signal is thus again applied to the disable gate 84 which functions to decouple junction 85 to ground to permit the switch driver 64 to be again controlled by the output signal from AND-gate 41. Vertical phase switch 12 is therefore closed while horizontal phase switch 13 is opened by virtue of lack of signal at the output of AND-gate 69. The vertical error signal from phase comparator 17 is thus placed in command of the head drum servo system until such time as vertical framing again occurs. In the event that the head drum servor system is under command of the horizontal error signal from horizontal phase comparator 18 when one of the key conditions, other than loss of vertical framing, is interrupted, the logic circuitry automatically recycles command of the head drum servo system to the tachometer error signal. This function occurs in the manner previously described with respect to the vertical and horizontal modes of operation by virtue of the signal at output 47 of gate 41 being terminated in response to interruption of any of the predetermined conditions. When all key conditions are again satisfied, the circuit cycles command of the head drum servo system sequentially from tachometer to vertical to horizontal error signals in the manner described above.

From the standpoint of convenience in operation and maintenance, it is desirable that the establishment of various operational conditions in the synchronizing system be readily indicated to the operator or maintenance man. Therefore the synchronizing system of the present invention is preferably provided with a system of tally lights for providing a visual indication of certain predetermined conditions. In this regard, tally lights 117, 118, and 119 are preferably respectively coupled to the outputs of switch drivers 61, 64, and 78 for energization in response to the application of control signals to the respective switches 11, 12, and 13. Light 117 is thus illuminated when the head drum servo system is under the command of the tachometer error signal, light 118 is illuminated when the vertical error signal is in command, and illumination light 119 occurs when the horizontal error signal is in command. In addition, a light 121 is advantageously connected to the output of the vertical framing sensor 74 to provide a visual indication of the establishment of vertical framing. Finally, a light 122 is preferably provided to indicate upon illumination, that the off tape horizontal sync is in phase lock with reference horizontal sync within certain narrow predetermined limits. In order that the light 122 accomplish the desired indicating function it is necessary that this light be associated with additional logic circuitry. More particaularly, a horizontal coincident sensor 123 is energized by the horizontal outputs of sync separators 27 and 29 and produces an output signal when the respective horizontal sync signals are in phase within the predetermined limits. As in the case of the vertical framing sensor 34, horizontal vertical sensor 23 is also coupled to the EE inhibit pulse input 76 such that output from the sensor 123 is prevented when the system is the EE, rather than the tape mode. The output of sensor 123 is applied to one input of a horizontal lock tally AND-gate 124, the output of which is coupled in energizing relation to the horizontal lock tally light 122. A second input of AND-gate 124 is coupled in common to the buses 38 and 39 from mode selector switch contacts 4 and 5, while a third input is connected to the output of horizontal mode OR-gate 77. Therefore, when the mode selector switch 32 is in either the horizontal or automatic mode positions corresponding to contacts 4 and 5, the horizontal switch driver 78 is energized by a signal from OR-gate 77, and horizontal coincidence is obtained within the predetermined limits, all inputs of the AND-gate 124 are energized and therefore an output signal from this gate effects illumination of the horizontal lock tally light 122.

Although the present invention has been described hereinbefore with respect to a single preferred embodiment thereof, it will be appreciated that various changes and modifications may be made therein without departing from the true spirit and scope of the invention, and therefore it is not intended to limit the invention except by the terms of the appended claims.

What is claimed is:

1. In a tape apparatus synchronzing system having means for generating a plurality of error signals, and servo means for controlling the angular velocity of a rotary magnetic transducer head drum in accordance with an error signal applied to the input of the servo means, the combination comprising a plurality of electronically controlled switches respectively coupled in receiving relation to said error signals and coupled in common to the input of said servo means, each of said switches having a control input for actuating the switch between open and closed conditions in response to a control signal at the control input, selector switch means having a plurality of selectable operational mode positions, and logic circuitry connected between said selector switch means and the control inputs of said electronically controlled switches for delivering control signals thereto generated in accordance with predetermined logic programs of said logic circuitry respectively selected by said selector switch means in different ones of said positions.

2. In a tape apparatus synchronizing system having means for generating tachometer, vertical, and horizontal error signals, and servo means for controlling the angular velocity of a rotary magnetic transducer head drum in accordance with an error signal applied to the input of the servo means, the combination comprising first, second, and third electronically controlled switches respectively coupled in receiving relation to said tachometer, vertical, and horizontal error signals and coupled in common to the input of said servo means, logic circuitry connected in controlling relation to said electronically controlled switches for effecting actuation thereof in accordance with first, second, third, fourth, and fifth predetermined logic programs, and selector switch means having selectable preset, normal, vertical, horizontal, and automatic mode positions, said selector switch means coupled to said logic circuitry and selecting said first, second, third, fourth, and fifth logic programs respectively in said preset, normal, vertical, horizontal, and automatic mode positions, said first and second programs being effective to close said first electronically controlled switch and open said second and third electronically controlled switches, said third program being effective to initially close said first and open said second and third electronically controlled switches, said third program being effective to open said first and close said second electronically controlled switches while maintaining said third switch open upon the establishment of predetermined key conditions in said synchronizing system, said third program being effective to close said first and open said second switches while maintaining said third switch open upon the loss of any of said predetermined key conditions, said fourth program being effective to initially close said first and open said second and third electronic switches, said fourth program being effective to open said first and close said third switches while maintaining said second switch open upon the establishment of said predetermined key conditions, said fourth program being effective to close said first switch and open said third switch while maintaining said second switch open upon the loss of any of said predetermined key conditions, said fifth program being effective to initially close said first and open said second and third electronic switches, said fifth program being effective to open said first and close said second switches while maintaining said third switch open upon the establishment of said predetermined conditions, said fifth program being effective to close said third and open said second switches while maintaining said first switch open upon the establishment of a key event, said fifth program being effective to close said second and open said third switches while maintaining said first switch open upon loss of said key event, said fifth program being effective to close said first and open said second and third switches upon the loss of any of said predetermined key conditions.

3. In a tape apparatus synchronizing system including first, second, and third phase comparators each having first and second inputs and an output generating a signal proportional to the phase difference between signals applied to the inputs, a servo system for controlling the angular velocity of a rotary magnetic transducer head drum in accordance with an error signal applied to the input of said servo system, rotational velocity transducer means driven by said head drum for generating a signal proportional to the rotational velocity of said drum, said signal from said velocity transducer means coupled to the first input of said first comparator, means applying off tape vertical sync and reference vertical sync signals to the first and second inputs of said second comparator, means applying off tape horizontal sync and reference horizontal sync signals to the first and second inputs of said third comparator, capstan servo means, a tape guide relay, and system control means for switching between electronic to electronic and tape modes, the combination comprising first, second, and third electronically controlled switches respectively connected to the outputs of said first, second, and third comparators and connected in common to said input of said servo system, a mode selector switch having preset, normal, vertical, horizontal, and automatic mode positions, and logic circuitry responsively coupled to said selector switch and coupled in controlling relation to said first, second, and third switches, said logic circuitry including AND-in gate means, capstan error sensor means coupled to said capstan servo means for generating a signal in response to the error signal to the capstan servo means diminishing to substantially zero, tape guide relay actuation sensor means for generating a signal in response to energization of said relay, tape sync sensor means for generating a signal in response to the existence of said off tape vertical sync signal, drum lock sensor means for generating a signal in response to the existence of phase lock up of said head drum, electronic to electronic-tape sensor means coupled to said system control means for generating a signal when said system is in the tape mode, and vertical framing sensor means coupled in receiving relation to said off tape and reference vertical sync signals for generating an output signal when the phase difference therebetween is zero, said AND-gate having a plurality of inputs respectively coupled to said capstan, tape guide relay, tape sync, drum lock, and electronic to electronic-tape sensor means and producing an output signal in response to signals at all of the gate inputs, said logic circuitry in response to said selector switch being in said preset position maintaining said first switch closed and said second and third switches open while applying a selectable external reference signal to said second input of said first comparator, said logic circuitry in response to said normal position of said selector switch maintaining said first switch closed and said second and third switches open while applying an external line sync signal to said second input of said first comparator, said logic circuitry in response to said vertical position of said selector switch maintaining said third switch open while closing said first switch and opening said second switch in the absence of an output signal from said gate and opening said first switch and closing said second switch in the presence of an output signal from said gate, said logic circuitry in response to said vertical position of said selector switch applying said reference vertical sync signal to the second input of said first comparator, said logic circuitry in response to said horizontal position of said selector switch maintaining said second switch open while closing said first switch and opening said third switch in the absence of an output signal from said gate and opening said first switch and closing said third switch in the presence of an output signal from said gate, said logic circuitry in response to said horizontal position of said selector switch applying said reference vertical sync signal to the second input of said first comparator, said logic circuitry in response to said automatic position of said selector switch closing said first switch while opening said second and third switches in the absence of output signals from said gate and said vertical framing sensor, said logic circuitry in response to said automatic position of said selector switch closing said second switch while opening said first and third switches in the presence of an output signal from said gate and absence of an output signal from said vertical framing sensor, said logic circuitry in response to said automatic position of said selector switch closing said third switch while opening said first and second switches in the presence of output signals from said gate and vertical framing sensor, said logic circuitry in response to said automatic position of said selector switch applying said reference vertical sync signal to the second input of said first comparator.

4. In a tape apparatus synchronizing system including first, second, and third phase comparators each having first and second inputs and an output generating a signal proportional to the phase difference between signals applied to the inputs, a servo system for controlling the angular velocity of a rotary magnetic transducer head drum in accordance with an error signal applied to the input of said servo system, rotational velocity transducer means driven by said head drum for generating a signal proportional to the rotational velocity of said drum, said signal from said velocity transducer means coupled to the first input of said first comparator, means applying off tape vertical sync and reference vertical sync signals to the first and second inputs of said second comparator, means applying off tape horizontal sync and reference horizontal sync signals to the first and second inputs of said third comparator, capstan servo means, a tape guide relay, and system control means for switching between electronic to electronic and tape modes, the combination comprising first, second, and third electronically controlled switch means each having a control input, said first switch means normally on and being turned off in response to a control signal at the control input thereof, said second and third switch means normally off and being turned on in response to control signals at the control inputs thereof, said first, second, and third switch means respectively connected to the outputs of said first, second, and third comparators and connected in common to said input of said servo system, a mode selector switch having preset, normal, vertical, horizontal, and automatic mode terminals and means for selectively arming said terminals with voltage, reference selection switch means having inputs receiving line sync, external sync, and said reference vertical sync signals and an output coupled to the second input of said first comparator, said selector switch terminals coupled in controlling relation to said reference selection switch means, said reference selection switch means coupling the reference vertical sync signal input to the second input of said first comparator in response to arming any of said vertical, horizontal, and automatic mode terminals with voltage, said reference selection switch means selectively coupling the line sync, external sync, and reference vertical sync inputs to the second input of said first comparator in response to arming said preset mode terminal with voltage, said reference selection switch means normally coupling the line sync input to the second input of said first comparator, capstan error sensor means coupled to said capstan servo means for generating a signal in response to the error signal to the capstan servo means diminishing to substantially zero, tape guide relay actuation sensor means coupled to said relay for generating a signal in response to energization thereof, tape sync sensor means for generating a signal in response to the existence of said off tape vertical sync signal, drum lock sensor means for generating a signal in response to the existence of phase lockup of said head drum, electronic to electronic—tape sensor means coupled to said system control means for generating a signal when said system is in the tape mode, an AND-gate having inputs respectively coupled to the outputs of said tape guide relay, tape sync, drum lock, and electronic to electronic—tape sensor means nad an input coupled in common to the output of said capstan error sensor means and the horizontal terminal of said selector switch, said AND-gate having an output at which a signal is produced in response to coincident energization of the inputs thereof, a second AND-gate having an input coupled to the output of said first AND-gate and a second input coupled in common to said vertical, horizontal, and automatic terminals of said selector switch, said second AND-gate having an output coupled in driving relation to the control input of said first electronically controlled switch means, controlled circuit path means coupling the output of said first AND-gate in driving relation to the control input of said second electronically controlled switch means, second controlled circuit path means coupling the output of said first AND-gate in driving relation to the control input of said third electronically controlled switch means, vertical framing sensor means coupled in receiving relation to said off tape and reference vertical sync signals for generating an output signal when the phase difference therebetween is zero, disable means responsively coupled to said vertical framing sensor means and said selector switch, said disable means coupled in controlling relation to said first controlled circuit path means for normally preventing the flow of signals therethrough and permitting the flow of signals therethrough in response to arming of said vertical terminal of said selector switch with voltage and in response to the absence of an output signal from said vertical framing sensor means while said horizontal terminal of said selector switch is armed with voltage, and gate circuit control means coupled in controlling relation to said second controlled circuit path means and responsively coupled to said vertical framing sensor means and to said horizontal and automatic terminals of said selector switch, said gate circuit control means permitting the flow of signals through said second controlled circuit path means only in response to arming of said horizontal terminals of said selector switch with voltage and in response to an output signal from said vertical framing sensor means while said automatic terminal is armed with voltage.

5. The combination of claim 4, further defined by said reference selection switch means comprising a reference selector switch having a plurality of terminals respectively connected to said line sync, external sync, and reference vertical sync signal inputs and a selector movable into engagement with respective ones of the terminals of said reference selector switch, and fourth, fifth, and sixth electrically controlled switch means respectively connected to said selector of said reference selector switch, said line sync signal input, and said reference vertical sync signal input, said fourth, fifth, and sixth switch means coupled in common to the second input of said first comparator, said fourth, fifth, and sixth switch means each having a control input, said fourth and sixth switch means normally off and being turned on in response to signals at the control inputs thereof, said fifth switch means normally on and being turned off in response to a signal at the control input thereof, said control input of said fourth switch means coupled to said preset terminal of said mode selector switch, said control input of said fifth switch means commonly coupled to said preset, vertical, horizontal, and automatic terminals of said mode selector switch, and said control input of said sixth switch means commonly coupled to said vertical, horizontal, and automatic terminals of said mode selector switch.

6. The combination of claim 4, further defined by first, second, and third indicator means respectively coupled to said first, second, and third switch means for energization when the same are on, fourth indicator means coupled to said vertical framing sensor means for energization in response to an output signal therefrom, fifth indicator means, horizontal coincidence sensor means coupled in receiving relation to said off tape and reference horizontal sync signals for generating an output signal when said off stape and reference horizontal sync signals are in phase within predetermined limits, and a horizontal lock AND-gate having inputs respectively coupled to said second controlled circuit path means and to the output of said horizontal coincidence sensor means and having an input coupled in common to said horizontal and automatic mode terminals of said mode selector switch, said horizontal lock AND-gate having an output coupled in energizing relation to said fifth indicator means.

7. The combination of claim 4, further defined by said disable means means comprising normally open electronically controlled switch means coupled between said first controlled circuit path means and ground and having a control input connected to said horizontal terminal of said mode selector switch, a disable gate coupled between said first controlled circuit path means and ground and having a control input, said disable gate normally closed and being opened in response to a signal at the control input thereof, a NOR-gate having inputs respectively connected to the output of said vertical framing sensor means and to said automatic terminal of said mode selector switch, and an OR-gate having inputs respectively connected to the output of said NOR-gate and to said vertical terminal of said mode selector switch, said OR-gate having an output coupled to the control input of said disable gate.

8. The combination of claim 7, further defined by said second controlled circuit path means comprising a bypass AND-gate having inputs respectively connected to the output of said first AND-gate and said horizontal terminal of said mode selector switch, a horizontal mode AND-gate having inputs respectively connected to the output of said first AND-gate, the output of said vertical framing sensor means, and to said automatic terminal of said mode selector switch, and a horizontal mode OR-gate having inputs respectively connected to the outputs of said by-pass and horizontal mode AND-gate and an output coupled to said third switch means.

9. In a tape apparatus synchronizing system including first, second, and third phase comparators each having first and second inputs and an output generating a signal proportional to the phase difference between signals applied to the inputs, a servo system for controlling the angular velocity of a rotary magnetic transducer head drum in accordance with an error signal applied to the input of said servo system, rotational velocity transducer means driven by said head drum for generating a signal proportional to the rotational velocity of said drum, said signal from said velocity transducer means coupled to the first input of said first comparator, means applying off tape vertical sync and reference vertical sync signals to the first and second inputs of said second comparator, means applying off tape horizontal sync and reference horizontal sync signals to the first and second inputs of said third comparator, capstan servo means, a tape guide relay, and system control means for switching between electronic to electronic and tape modes, the combination comprising first, second and third electronically controlled switches each having a control input, said switches being normally open and closed in response to signals at the control inputs thereof, said first, second and third switches respectively connected to the outputs of said first, second and third comparators and connected in common to said input of said servo system, first, second and third switch drivers respectively coupled to the control inputs of said first, second, and third switches, said first switch driver being normally on and turned off in response to a signal at an input thereof, said second and third switch drivers being normally off and turned on in response to signals at inputs thereof, a mode selector switch having preset, normal, vertical, horizontal, and automatic mode contacts and means for selectively arming said contacts with voltage, line sync, external sync, and video sync inputs, a playback reference selector switch having a plurality of contacts respectively connected to said line sync, external sync, and reference vertical sync inputs and a selector movable in the engagement with the respective contacts of the playback reference switch, a record reference switch, a record reference selector switch having a plurality of contacts respectively connected to said line sync video sync inputs and a selector movable into engagement with respective ones of contacts of said record reference switch, a playback-record selector switch having playback and record contacts and a selector movable between said playback and record contacts, a fourth electronically controlled switch coupled between the selector of said playback reference selector switch and said playback of said contact of said playback-record selector switch and having a control input, said fourth switch being normally off and turned on in response to a signal at the control input thereof, a fifth electronically controlled switch connected between said line sync input and said playback contact of said playback-record selector switch and having a control input, said fifth switch being normally on and turned off in response to a signal at the control input thereof, a sixth electronically controlled switch connected between said reference vertical sync input and said playback contact of said playback-record switch and having a control input, said sixth switch being normally off and turned on in response to a signal to the control input thereof, a seventh electronically controlled switch connected between the selector of said record switch and having a control input, said seventh switch being normally off and turned on in response to a signal at the control input thereof, an eighth electronically controlled switch connected between said video sync input and said record contact of said playback-record switch and having a control input, said eighth switch being normally on and turned off in response to a signal at the control input thereof, said control inputs of said fourth, seventh, and eighth switches connected to said preset contact of said mode selector switch, said control input of said fifth switch connected in common to said preset, vertical, horizontal, and automatic contacts of said mode selector switch, said control input of said sixth switch connected in common with said vertical, horizontal, and automatic contacts of said mode selector switch, means coupling said selector of said playback-record switch to the second input of said first comparator capstan error sensor means coupled to said capstan servo means for generating a signal in response to the error signal to the capstan servo means diminishing to substantially zero, tape guide relay actuation sensor means coupled to said relay for generating said signal in response to said generation thereof, tape guide relay means for generating a signal in response to the existence of said off tape vertical sync signal, drum lock sensor means for generating a signal in response to the existence of phase lock up of said head drum, electronic to electronic-tape servo means coupled to said system control means for generating said signal with said system in said tape mode, an AND-gate having inputs respectively coupled to the outputs of said tape guide relay, tape sync, drum lock, and electronic to electronic-tape sensor means and an input coupled in common to the output of said capstan error sensor means and the horizontal terminal of said mode selector switch, said AND-gate having an output at which a signal is generated in response to coincidence energization of the inputs thereof, a second AND-gate having an input coupled to the output of said first AND-gate and a second input coupled in common to said vertical, horizontal, and automatic terminals of said mode selector switch, said second AND-gate having an output coupled to the input of said first switch driver, a circuit path connecting the output of said first AND-gate to the input of said second switch driver, a ninth electronic controlled switch connected between said circuit path and ground and having control input, said ninth switch being normally open and closed in response to a signal at the control input thereof, said control input of said ninth switch connected to said horizontal contact of said mode selector switch, a disable gate connected between said circuit path and ground and having a control input, said disable gate being normally closed and opened in response to a signal at the control input thereof, vertical framing sensor means coupled in receiving relation to said off tape and said reference vertical sync signals for generating an output signal when the phase difference therebetween is zero, a NOR-gate having inputs respectively connected to the output of said vertical framing sensor means and to said automatic contact of said mode selector swich, an OR-gate having inputs respectively coupled to the output of said NOR-gate and to said vertical contact of said mode selector switch, said OR-gate having an output coupled to the control input of said disable gate, a third AND-gate having inputs respectively connected to the output of said first AND-gate, the output of said vertical framing sensor means, and said automatic contact of said mode selector switch, a fourth AND-gate having inputs respectively connected to the output of said first AND-gate and to said horizontal contact of said mode selector switch, and a second OR-gate having inputs respectively connected to the outputs of said third and fourth AND-gate and an output connected to the control input of said third switch driver.

10. The combination of claim 9, further defined by first, second, and third indicator means respectively connected to the outputs of said first, second, and third switch drivers, a fourth indicator means coupled to the output of said vertical framing sensor means, horizontal coincidence sensor means coupled in receiving relation to said off tape and reference horizontal sync signals for generating an output signal when said off tape and reference horizontal sync signals are in phase within predetermined limits, a fifth AND-gate having inputs respectively connected to the output of said horizontal coincidence sensor and to the output of said second OR-gate and having an input connected in common with the horizontal and automatic contacts of said mode selector switch, and a fifth indicator means coupled to the output of said fifth AND-gate.

11. The combination of claim 10, further defined by means coupled to said system control means for inhibiting the outputs of said vertical framing sensor means and said horizontal coincidence sensor means when said system is in the electronic to electronic mode.

References Cited

UNITED STATES PATENTS

| | | | |
|---|---|---|---|
| 2,944,108 | 7/1960 | Houghton | 178—6.6 |
| 3,318,998 | 7/1967 | Kihara | 178—6.6 |

ROBERT L. GRIFFIN, *Primary Examiner.*

H. W. BRITTON, *Assistant Examiner.*